Feb. 4, 1947.   R. E. J. NORDQUIST   2,415,109
FILLING MACHINE
Filed April 13, 1945   4 Sheets-Sheet 2
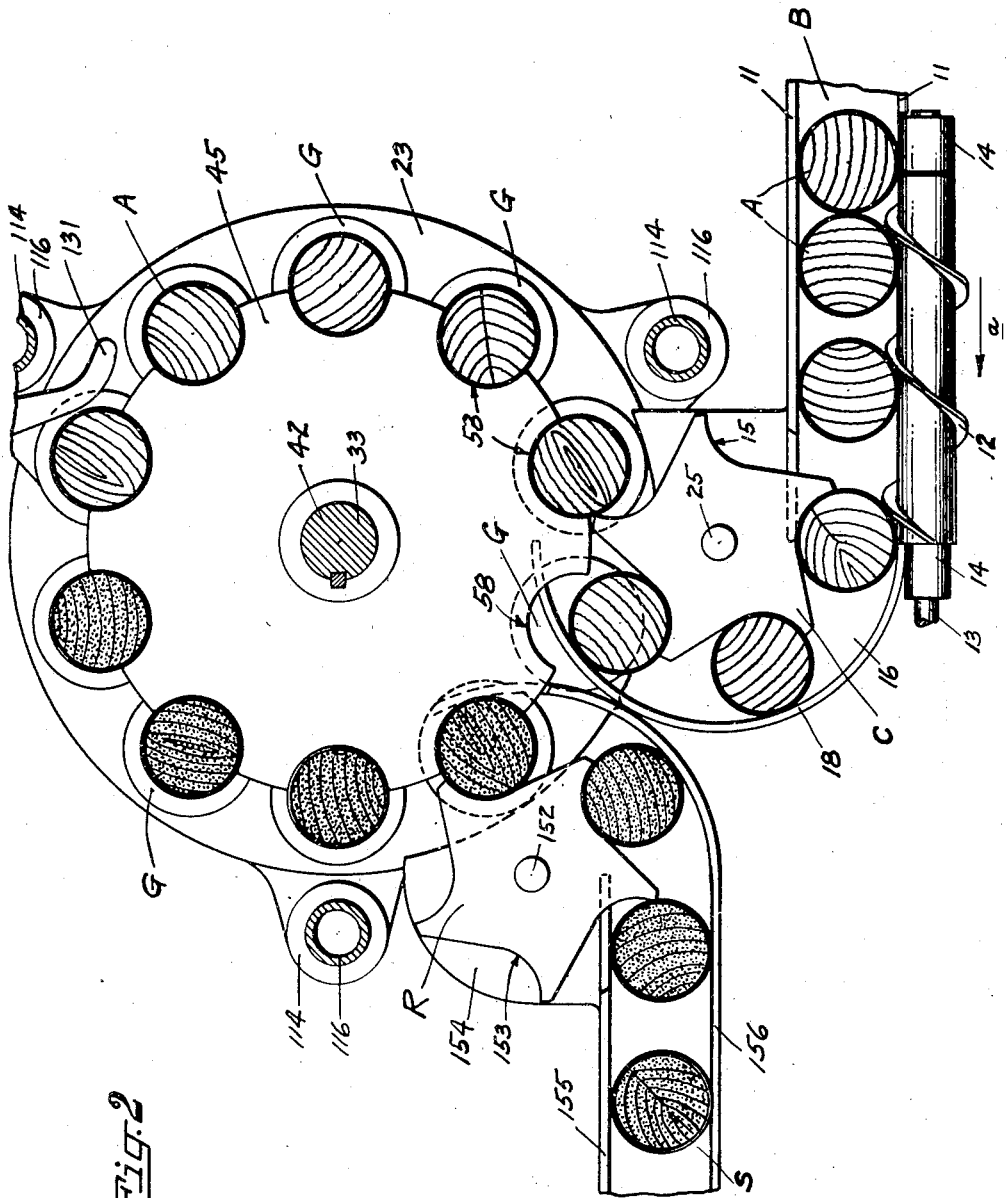
INVENTOR.
Ronald E. J. Nordquist
BY Ivan D. Thornburgh
Charles H. Erne
ATTORNEYS

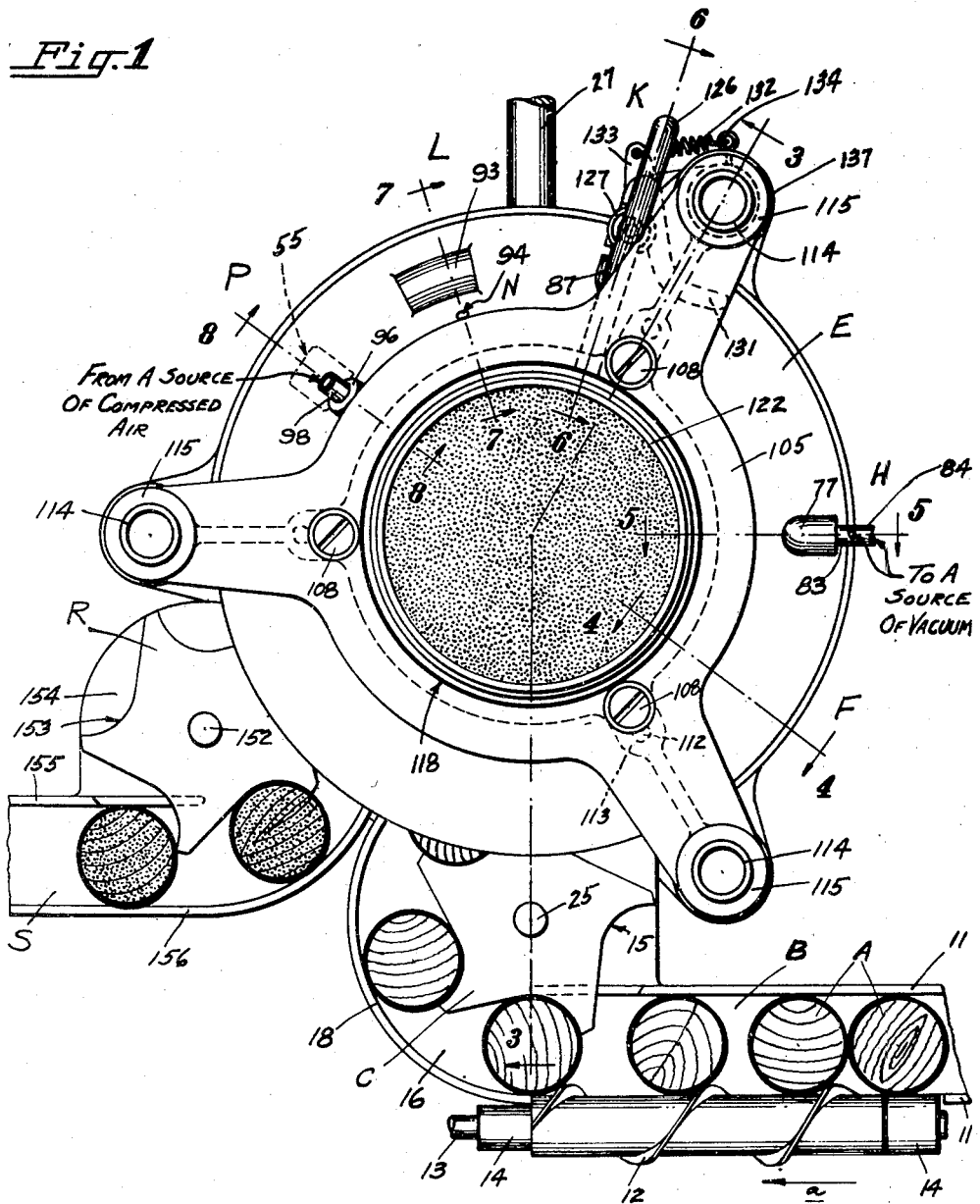

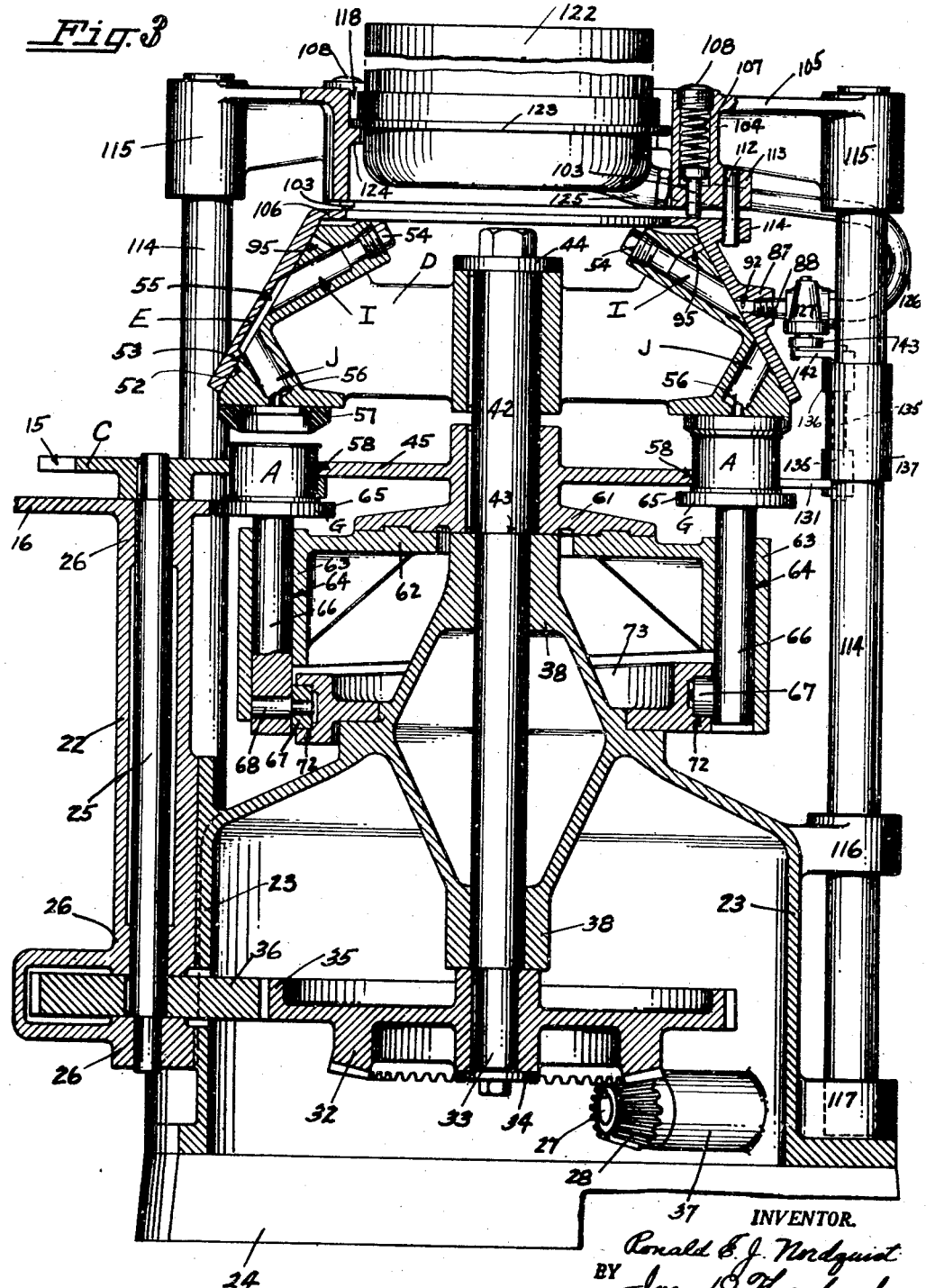

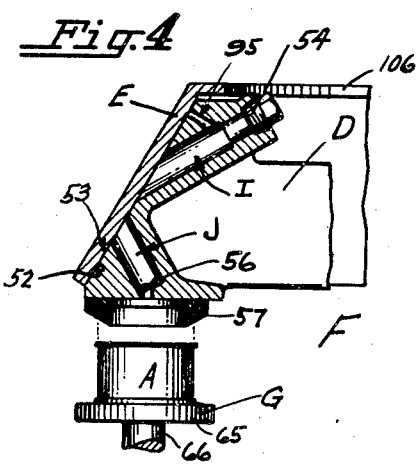
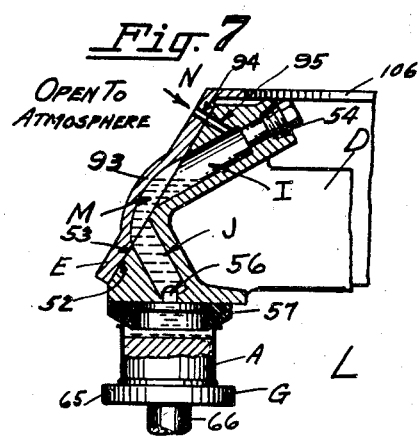
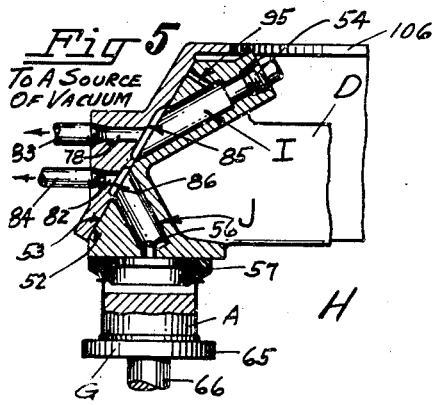
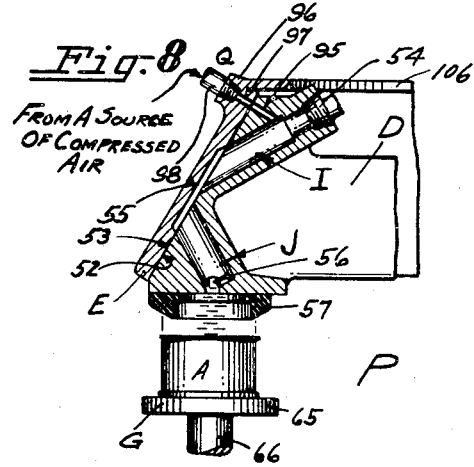
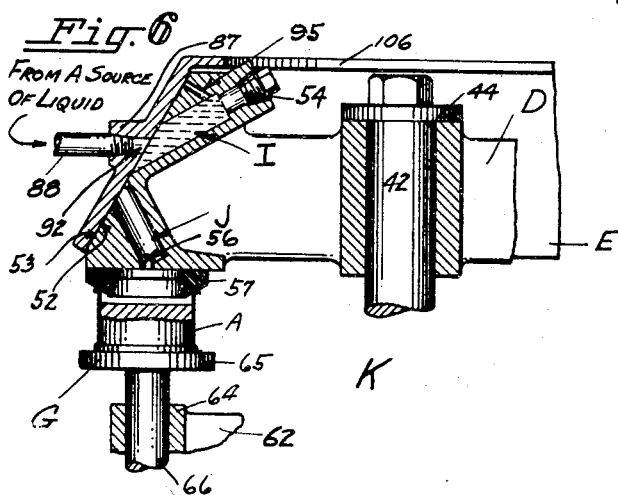

Patented Feb. 4, 1947

2,415,109

UNITED STATES PATENT OFFICE 2,415,109

FILLING MACHINE

Ronald E. J. Nordquist, Maplewood, N. J., assignor to American Can Company, New York, N. Y., a corporation of New Jersey Application April 13, 1945, Serial No. 588,085

10 Claims. (Cl. 226—116)

This invention relates to a vacuum filling and liquid measuring machine and has particular reference to a rotatable head member having a plurality of measuring chambers which are sealed off for vacuumizing preparatory to being filled with a predetermined quantity of liquid or semi-liquid material such as an oil, a sauce or the like, which material thereafter is discharged into an empty or partly filled can or other container.

An object of the invention is the provision of a vacuum filling and liquid measuring machine having a rotatable head member provided with a plurality of measuring chambers formed in the periphery thereof which chambers are sealed off for vacuumization as an incident to drawing in a predetermined quantity of liquid or semi-liquid material into each chamber which material thereafter is discharged into a container such as a partly filled can, the cans being advanced through the machine for final filling.

Another object of the invention is the provision of a machine of the character described, of a conical shaped rotatable head member having a plurality of measuring chambers extending inwardly from the outer periphery thereof, the chambers connecting with interconnecting passageways leading to individual filling heads carried in the rotatable head member, such a member rotating within a non-rotatable floating housing, the measuring chambers and the inter-connecting passageways being brought progressively into communication with a vacuum system and with a reservoir whereby a measured quantity of the material is delivered rapidly through the individual filling heads to associated partly filled cans.

Numerous other objects and advantages of the invention will be apparent as it is better understood from the following description, which, taken in connection with the accompanying drawings, discloses a preferred embodiment thereof.

Referring to the drawings:

Figure 1 is a top plan view of a vacuum filling machine embodying the present invention with parts broken away;

Fig. 2 is a horizontal sectional view of the machine shown in Fig. 1 as it would appear if taken along a plane just above the feed line, with parts broken away;

Fig. 3 is a vertical section of the machine as viewed substantially along the broken lines 3—3 in Fig. 1;

Fig. 4 is a fragmentary sectional view taken substantially along the line 4—4 in Fig. 1 and showing a can being lifted into place beneath a filling head;

Fig. 5 is a view similar to Fig. 4, taken substantially along the line 5—5 in Fig. 1 and showing a partly filled can in position for being vacuumized together with its associated measuring chamber;

Fig. 6 is a view similar to Fig. 5 taken substantially along the line 6—6 in Fig. 1 and showing the vacuumized measuring chamber being filled with a liquid material;

Fig. 7 is a view similar to Figs. 5 and 6 taken substantially along the line 7—7 in Fig. 1 and showing the vacuumized can in communication with a liquid filled measuring chamber while it is being vented as during the filling of the can; and Fig. 8 is a view similar to Fig. 4, taken substantially along the line 8—8 in Fig. 1, showing a filled can after being lowered from the rotary filling head and illustrating a compressed air connection in registration with the measuring chamber for discharging the residual liquid into the can.

As a preferred embodiment of the present invention the drawings illustrate a vacuum filling and liquid measuring machine for depositing liquid or semi-liquid material into partly filled cans. In filling certain types of metal cans or other containers the substantially solid food products first are placed in the can and then a liquid such as oil, a syrup or a sauce is added to the can. For example, in packing fish or like food, an edible oil is added to the already partly filled can which for obvious reasons is to contain an exact predetermined quantity of solid and liquid to form the desired combination for each can.

In the instant invention cans A partly filled with solid food such as fish are fed from a filling machine or other suitable source of supply by a conveyor B and toward the machine by a feed-in star wheel C directly into the machine wherein they are slid onto a lifter plate and are raised into one of a plurality of filling heads carried in a conical shaped rotatable head member D. Here the cans are vacuumized and oil filled progressively while being carried along a circular path of travel beneath a non-rotatable floating housing E (see also Fig. 3).

As each partly filled can advances along its circular path in a counter clockwise direction as viewed in Figs. 1 and 2, it passes through a series of working stations disposed in its path. These stations are illustrated in Figs. 3 to 8, inclusive, of the drawings. Thus as a can A moves into an initial work station F of the machine, located substantially at the section line 4—4 in Fig. 1, the can A is raised by its lifter plate this being an individual unit of a lifting device G. In this lifting action the can is brought against a sealing unit of one of the filling heads of the head member D preparatory to being vacuumized.

Each unit of the lifting device G is of conventional form. The units both raise and carry the cans A and hold each can against its respective sealing unit while moving along with it. Thus as a can A moves into its next working station, identified by the letter H (Figs. 1 and 5), it is subjected to vacuum. Fig. 5 also illustrates an associated measuring chamber I, disposed above a connecting passageway J both of which are a part of a filling head. A chamber I and its associated passageway J are subjected to the same vacuum and at the same time.

The partly filled and vacuumized can A continues to move while both its measuring chamber I and its associated passageway J are sealed off from the vacuum source. In this sealed-off condition the can reaches a working station K, substantially at the line 6—6 Fig. 1. It is at this station that a predetermined quantity of the desired liquid such as oil is drawn into the vacuumized measuring chamber. This liquid may be received from a liquid supply tank or reservoir forming a part of the machine (see also Figs. 3 and 6).

A further rotation of the turret seals off the liquid supply from the measuring chamber I, this liquid now being ready for deposit into a can A. Deposit is effected at the next station, identified by the letter L which it will be observed is substantially at the line 7—7 in Fig. 1. At station L (see also Fig. 7) a connecting discharge passageway M is located in the housing E and the filled measuring chamber I, and its passageway J of the filling head under consideration comes in register with the passageway M. There now follows a discharge of the liquid first from the measuring chamber into the passageway J and thence from there into the can A.

This discharge is facilitated by venting the upper end of the measuring chamber as at N thus breaking the vacuum in the chamber and in the adjoining passageway. Being now under atmospheric pressure, the can A now filled with both its fish and contents and its oil is in condition to be lowered from the filling head by descent of the lifter plate of the lifting device G. This lifter plate begins to operate on its down stroke immediately after the oil is in the can.

Lowering of the filled can A is gradual and takes place while the can moves from station L to a succeeding station P located at the line 8—8 in Fig. 1. When the station P is reached the can A is in fully lowered position below its associated filling head. At this station (see also Fig. 8) the measuring chamber I and its adjoining passageway J are again brought into communication and thus a more complete drainage of the liquid into the can A takes place. As a further insurance provision is made at this station for delivering a blast of air by way of a vent opening as at Q thus sweeping out any residual oil which might cling to the surfaces of the measuring chamber I and the passageway J.

The filled can A now is ready for discharge from the machine and as the can continues along its circular path of travel it moves into position for transfer by a discharge star wheel R (Figs. 1 and 2). This star wheel ejects the individual filled can from the machine and directs it onto a discharge conveyor S. The discharge conveyor may advance the cans to an adjacent machine which in some cases will include suitable means for closing and sealing the cans.

Reference now will be had to a more detailed consideration of the instant invention. The partly filled cans A are advanced by the conveyor B toward the machine in a direction indicated by an arrow a (Figs. 1 and 2). Side rails 11 located above the conveyor guide the cans into the path of a worm feed 12. This worm feed is mounted at one side of and just above the conveyor on a shaft 13, journaled in bearings 14 which may be formed as a part of a suitable supporting frame.

The conveyor B and the worm feed 12 preferably are driven from the machine main drive in suitable manner which for the purpose of this invention need not be described further. Worm 12 feeds individual cans in proper time into receiving pockets 15 of the feed-in star wheel C. During transfer into the machine by the star wheel, the cans A pass along a circular path of travel moving over a table 16. The cans A are guided while moving along the table 16 by a concentric side rail 18 which is secured to the table.

Table 16 is formed as an integral upper part of a bracket 22 which is secured to a machine frame 23 mounted on a main base 24 (Fig. 3). The star wheel C moves with and is secured to the upper end of a vertical shaft 25. This shaft is journaled in suitable bearings 26 in the bracket 22. Shaft 25 is driven by a gear train from a horizontal machine drive shaft 27. Shaft 27 constitutes the main drive of the machine.

In this gear train the shaft 27 carries a bevel drive gear 28 which meshes with and rotates a bevel gear 32 mounted on the lower end of a vertical shaft 33. A washer 34 bolted to the lower end of the shaft 33 secures the gear 32 in place. Gear 32 is formed integral with a drive gear 35 which meshes with and in turn drives a gear 36 mounted on the star wheel shaft 25. In this way the star wheel C is rotated in time with the other parts of the machine.

Shaft 27 is journaled in a bearing 37 formed in the machine frame 23 and may be driven from a convenient source in any suitable manner. Shaft 33 is journaled in bearings 38 also formed in the machine frame 23. Shaft 33 has an enlarged upper section 42 which forms a supporting shoulder as at 43. This shoulder bears against the top face of the upper bearing 38 of the frame 23. This provides the proper support for carrying the shaft 33.

The rotatable head member D is mounted on the upper enlarged section 42 of the shaft 33 (Fig. 3). A washer 44 locks the head member in place, a center bolt passing through the washer and into this end of the shaft. A rotatable turret 45, located beneath the head member D, also is mounted on the shaft 33 and thus rotates in unison therewith.

The measuring chambers I of the several filling heads are disposed at an angle with the outer conical or tapered periphery which is identified by the numeral 52 (Figs. 3 to 8, inclusive). The open peripheral ends of these chambers are sealed off by a closely fitting tapered surface 53 formed on the inside contacting face of the non-rotatable floating housing E. Each chamber I is sealed off at its inner and upper end by a screw plug 54. If desired such a plug may be provided with a variable threaded setting or with a displacement part so that changes may be made in the volumetric dimensions of the measuring chambers.

As already mentioned each connecting passageway J is directly below its corresponding measuring chamber I in its particular filling head. Passageways J, like chambers I, extend out through the peripheral tapered surface 52. From station L (Fig. 7) where the filling operation takes place as when the passageway M forms a connection for the chamber I and passageway J, to station P where the air cleaning takes place, the chamber I and passageway J are sealed off by the housing E.

At station P a vertical groove 55 is formed in the contact wall of the housing E (Fig. 8). It will be recalled that mention was made of again bringing chamber I and passageway J into communication at this station P. This is the mission of the groove 55. Each passageway J has an outlet at its inner or lower end as at 56 through which the liquid from the measuring chamber passes during the filling of the cans.

The sealing of a can at its open end prior to its vacuumizing and its oil filling is accomplished by a sealing unit which is shown here as a ring 57 preferably made of yieldable material such as rubber. This ring is in a position surrounding the outlet 56 and the open mouth of the can is sealed off air-tight where it engages the ring.

The rotatable turret 45 includes a horizontal circular web section having a plurality of semi-circular pockets 58 formed in its outer periphery (Figs. 2 and 3). The cans A enter into these pockets for advancement along their circular paths of travel. The turret 45 has a horizontal flange 61 at its lower end to which is secured a rotary member 62. This latter member has a plurality of equally spaced bosses 63 one beneath each turret pocket. A vertical slideway 64 is formed in each boss and it is within each slideway that one of the lifter units of the lifting device G operates.

The lifter plate of each lifter unit is designated by the numeral 65 and is mounted on and is secured to the upper end (Fig. 3) of a vertically movable slide shaft 66. This shaft is cam actuated and carries a cam roller 67 at its lower end, the roller turning loosely on a pin 68. Cam roller 67 operates in a cam track 72 formed in an edge cam 73 which is secured to the frame 23.

The non-rotatable floating housing E functions with its tapered contact wall 53 as the outer section of a valve member and the head wall 52 is the inner section. The housing is cut through in places with ports with which vacuum, liquid and air supply lines connect.

Housing E is provided with a lug 77 which projects out and above its exterior surface at station H (Figs. 1 and 5). Openings 78, 82 cut in the lug extend through the contact wall and pipes 83, 84 are threadedly secured into the openings. These pipes connect with a suitable source of vacuum. Grooves 85, 86 cut on the inner surface 53 of the contact wall extend laterally for a distance sufficient to prolong the time the pipe openings are in communication with a chamber I and a passageway J, since the head and the can are moving without interruption.

A similar lug 87 is formed on the exterior surface of the housing at station K (Figs. 1, 3 and 6). A pipe 88 is threaded into an opening 92 extending through the housing and opening out in the contact face 53. This pipe is connected to a source of supply of a liquid such as oil as will be described hereinafter.

At station L (Figs. 1 and 7) a raised boss 93 is formed on the exterior surface of the housing E. This provides a covering for the passageway M in the housing. A vent opening 94 extends through the housing wall at this station, this being at the place N where the vacuum on the measuring chamber is broken. Opening 94 registers with one of a series of openings 95 cut in the rotary head D there being an opening 95 for each of the measuring chambers in each filling head.

At station P a lug 96 (Figs. 1 and 8) on the upper edge of the exterior surface of the housing affords sufficient stock for enclosing an opening 97. A pipe 98 is threaded into the opening and is connected to a convenient source of compressed air. Opening 97 like opening 94 is adapted to register successively with the respective openings 95 of the filling heads for blowing out the residual liquid from the measuring chambers I and passageways J, as previously described.

The housing E is maintained in its floating and nonrotatable position on the rotary head D by mechanism shown in Figs. 1 and 3. The floating character of the housing is effected by spaced spring pressed plungers 103 carried in bosses 104 of an upper anchor ring member 105 (Figs. 1 and 3). These plungers, of which there are three, press against a horizontally disposed rim 106 formed on the upper edge of the housing E. A spring 107 backs up each of the plungers 103 and is confined within its boss 104 by a cap screw 108.

The housing E is held against rotation by a plurality of spaced pins 112. There are three such pins and these are carried in lug extensions 113 of the bosses 104 of the ring member 105 (Fig. 3). Pins 112 extend down into openings provided in spaced bosses 114 formed on the upper outer edge of the housing E.

The ring member 105 is supported on the upper ends of vertical posts 114. These posts are secured in lugs 115 formed on three outwardly extending arms of the ring member. Posts 114 at their lower end are carried in lugs 116 and 117 of the frame 23.

Ring member 105 has a central annular opening 118 within which a liquid supply tank or reservoir 122 is located. Such a reservoir is surrounded by a flanged ring 123 which provides a convenient way of supporting the tank in the ring member. An annular ledge 124 on the inner wall of the ring member gives a proper support for the flanged ring.

Reservoir 122 is provided with an outlet connection 125 at the bottom so that a supply of oil or the like contained therein for filling into the cans A will flow by gravity directly to the measuring chambers. For this purpose flexible hose 126 is secured at one end to the outlet 125 and at the other end the hose leads to a liquid fill valve 127. This valve is carried by and is threaded to the pipe 88.

The liquid fill valve 127 is part of a no-can-no-fill device which effects flow of liquid from the supply reservoir 122 to the measuring chamber I only when a can A is presented at the filling station K (Figs. 1 and 3). Such a device includes a lever arm 131 which is disposed in the path of travel of the cans A approaching the filling station. The lever arm is moved outwardly upon being engaged by an oncoming can A and this movement opens the valve 127. The liquid from the reservoir thereupon flows into the chamber I.

The lever arm is returned at once to its original position by a spring 132 hooked onto a short arm extension 133 of the lever arm. The opposite end of the spring is held by a screw eye 134 fixed to a stationary part of the machine. Lever arm 131 is secured to the lower end of a rocker shaft 135 carried in bearings 136 of a bracket 137.

This bracket is secured to one of the vertical posts 114 adjacent the filling station K. The screw eye 134 referred to above may be carried in the bracket 137. At the upper end the shaft 135 carries a lever 142 which engages with and operates a movable element 143 in the valve 127. This element opens and closes the valve and thus regulates the flow of the liquid only when a can A is present.

The discharge star wheel R hereinbefore described, is mounted on the upper end of a vertical shaft 152 (Fig. 1). This shaft like shaft 25 also is journaled in bearings as in the bracket 22, there being a duplicate bracket at the discharge end of the machine for this purpose. Shaft 152 is rotated in time with the shafts 25 and 33 and for this purpose is gear driven from the drive gear 35.

The star wheel R like star wheel C also has pockets as at 153 for receiving the filled can A from the machine. The cans upon being discharged and while being advanced by the star wheel travel over a table 154 for delivery onto the discharge conveyor S, as previously described. The cans A are guided over the table 154 and onto the conveyor S by side rails 155, 156 carried on the table 154 and on the conveyor S.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a vacuum filling and liquid measuring machine for containers, the combination of a rotatable turret for advancing cans to be filled, a rotatable head member mounted above said turret and movable therewith, said head member having a plurality of measuring chambers leading from its outer periphery, means in said head member for sealing off individual cans carried by said turret, a non-rotating floating housing surrounding said head member and said chambers, vacuumizing means in said housing for vacuumizing said chambers and the cans, and means in said housing for discharging a measured amount of liquid into the vacuumized can from a said measuring chamber.

2. In a vacuum filling and liquid measuring machine for containers, the combination of a rotatable turret for advancing cans to be filled along a path of travel, a rotatable head member mounted above said turret and movable therewith, a plurality of measuring chambers extending inwardly from the outer periphery of said head member, filling heads carried by said head member for sealing off individual cans carried by said turret, a non-rotating floating housing surrounding said head member and said chambers, vacuumizing means in said housing for vacuumizing a said chamber and a said can, and means in said housing for discharging a measured amount of liquid through a said filling head into the vacuumized can from a said measuring chamber.

3. In a vacuum filling and liquid measuring machine for containers, the combination of a rotatable turret for advancing cans to be filled along a path of travel, a rotatable head member mounted above said turret and movable therewith, a plurality of measuring chambers extending inwardly from the outer periphery of said head member, means in said head member for sealing off individual cans carried by said turret, a non-rotating floating housing surrounding said head and said chambers, vacuumizing means in said housing for vacuumizing said chambers and the cans carried in said turret, and a connecting passageway located in said housing for discharging a measured amount of liquid into the vacuumized can from a said measuring chamber.

4. In a vacuum filling and liquid measuring machine for containers, the combination of a rotatable turret for advancing cans to be filled, a rotatable head member mounted above said turret and movable therewith, a plurality of measuring chambers extending inwardly from the outer periphery of said head member, sealing head units carried by said head member for sealing off individual cans advanced by said turret, interconnecting passageways leading inwardly in said head member, a non-rotating floating housing surounding said head member with its said chambers and its inter-connecting passageways, vacuumizing means in said housing for vacuumizing said chambers, said passageways and said cans, and means in said housing for discharging a measured amount of liquid into the vacuumized can from a said measuring chamber by way of said passageway.

5. In a vacuum filling and liquid measuring machine for containers, the combination of a rotatable turret for advancing cans to be filled along a circular path of travel, a rotatable head member mounted above said turret and movable therewith, said head member having a plurality of filling heads, each head having a measuring chamber and a communicating vent port, means in said filling heads for sealing off individual cans carried by said turret, a non-rotating floating housing surrounding said head member for sealing off said chambers and said ports, vacuumizing means in said housing for vacuumizing said chambers and the sealed off cans associated therewith, vent means in said housing for breaking the vacuum in said chambers, and means in said housing for discharging a measured amount of liquid into said vacuumized can from a said measuring chamber.

6. In a vacuum filling and liquid measuring machine for containers, the combination of a machine frame, a rotatable turret carried on said frame for advancing cans to be filled, can lifting devices carried in said turret for lifting the cans into filling position as they are advanced, a rotatable head member mounted above said turret and movable therewith, said head member having a plurality of measuring chambers extending inwardly from its outer periphery, means in said head for sealing off individual cans carried by said turret, a non-rotating floating housing surrounding said head member and said chambers, vacuumizing means in said housing for vacuumizing said chambers and the cans, and means in said housing for discharging a measured amount of liquid into the vacuumized can from a said measuring chamber.

7. In a vacuum filling and liquid measuring machine for containers, the combination of a rotatable turret for advancing cans to be filled, a rotatable head member mounted above said turret and movable therewith, a plurality of measuring chambers extending inwardly from the outer periphery of said head member, sealing units carried by said head member for sealing off individual cans advanced by said turret, a non-rotating floating housing surrounding said head member, vacuumizing means in said housing for vacuumizing said chambers and the cans, means in said housing for discharging a measured amount of liquid into the vacuumized can from a said measuring chamber, and means also located in said housing for passing a blast of air into each measuring chamber following a can filling operation to remove residual liquid from the walls of said chamber.

8. In a vacuum filling and liquid measuring machine for containers, the combination of a rotatable turret for advancing cans to be filled, a rotatable head member mounted above said turret and movable therewith said head member having a conical periphery, a plurality of measuring chambers extending inwardly from said periphery, a non-rotating floating housing having an inner conical surface engaging said head periphery and surrounding said chambers, pressure applying means exerted against said housing for maintaining an air-tight engagement with said head periphery, vacuumizing means in said housing for vacuumizing said chambers and the cans, and means also located in said housing for discharging a measured amount of liquid into the vacuumized can from a said measuring chamber.

9. In a vacuum filling and liquid measuring machine for containers, the combination of a rotatable turret for advancing cans to be filled, a rotatable head member mounted above said turret and movable therewith, a plurality of measuring chambers extending inwardly from the outer periphery of said head member, sealing rings carried by said head member for sealing off individual cans advanced by said turret, a non-rotating floating housing surrounding said head member and said chambers, vacuumizing means in said housing for vacuumizing said chambers and the cans, a reservoir having connection with said housing for filling liquid into said vacuumized chambers, and means in said housing for discharging a measured amount of liquid into the vacuumized can from a said measuring chamber and through a said sealing ring.

10. In a vacuum filling and liquid measuring machine for containers, the combination of a rotatable turret for advancing cans to be filled, a rotatable head member mounted above said turret and movable therewith, a plurality of measuring chambers extending inwardly from the outer periphery of said head member, a non-rotating floating housing surrounding said head member and said chambers, vacuumizing means in said housing for vacuumizing said chambers and the cans, a reservoir having connection with said housing for filling liquid into said vacuumized chambers, a no-can-no-fill device located in said reservoir housing connection for preventing passage of liquid into a said vacuumized chamber in the absence of a can in said turret, and means in said housing for discharging a measured amount of liquid into the vacuumized can from a said measuring chamber.

RONALD E. J. NORDQUIST.